A. W. COLEMAN.
DIRECTIONOMETER.
APPLICATION FILED JULY 26, 1919.
1,415,147. Patented May 9, 1922.
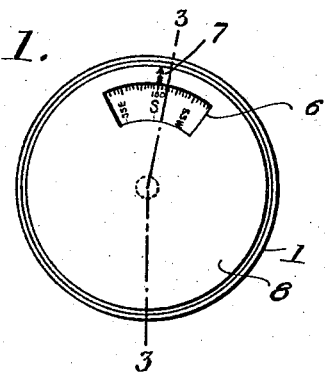
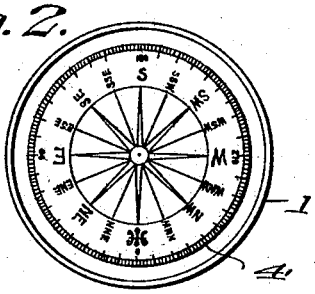
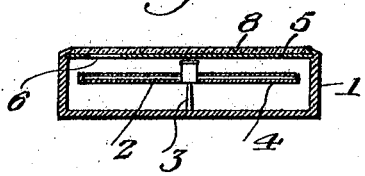
A. W. Coleman
INVENTOR.
BY
Victor J. Evans
ATTORNEY.

UNITED STATES PATENT OFFICE.

ALONZO WILSON COLEMAN, OF PITTSBURGH, PENNSYLVANIA.

DIRECTIONOMETER.

1,415,147.    Specification of Letters Patent.    Patented May 9, 1922.

Application filed July 26, 1919. Serial No. 313,423.

*To all whom it may concern:*

Be it known that I, ALONZO WILSON COLEMAN, a citizen of the United States, residing at Pittsburgh, in the county of Allegheny and State of Pennsylvania, have invented new and useful Improvements in Directionometers, of which the following is a specification.

This invention relates to an instrument or meter for designating the direction in which a person is traveling.

One of the main objects of the invention is to provide an instrument of the character stated of simple construction and operation by means of which a person may readily ascertain at a glance the direction in which he is traveling without the necessity of referring to but a single indicating mark. A further object is to provide an instrument including a compass dial and a closure member positioned above the dial and provided with an observation opening and an indicating mark by means of which the direction in which the user is traveling may be readily and accurately ascertained at a glance. Further objects will appear from the detailed description.

In the drawings:—

Figure 1 is a plan view of an instrument constructed in accordance with my invention.

Figure 2 is a similar view with the apertured closure member removed.

Figure 3 is a section taken substantially on line 3—3 of Figure 1.

In constructing my instrument, I provide a casing 1 within which a compass needle 2 is supported upon a pin 3 for free movement in the known manner. A compass dial 4 is secured upon the needle 2 for movement therewith, the upper surface of this dial being suitably marked and graduated to indicate points of the compass and degrees thereof. A closure disc 5 is mounted in casing 1 above the dial 4, this disc being preferably formed from opaque material. The disc 5 is provided with an observation opening 6 which is positioned above the outer portion of the dial. The disc is further provided with an indicating mark 7 in the form of an arrow which extends radially of the disc from opening 6.

In practice, the user holds the instrument so that the indicating mark or arrow 7 points in the direction in which he is traveling. As the needle 2 serves to normally maintain the compass dial in predetermined rotary position, by noting the mark upon this dial which is in register with the indicating mark 7 the user may readily ascertain at a glance in which direction he is traveling. The provision of the opaque closure disc 5 with the observation opening 6 and mark 7 serves to conceal the greater portion of the compass dial while permitting observation of sufficient thereof to enable the user to ascertain quickly and accurately the direction of travel while preventing confusion such as would be apt to result from viewing the complete upper surface of the dial. To prevent entry of foreign materials into the casing, a crystal or closure member 8 of glass or other suitable transparent material is secured above the disc 5 in any suitable manner, this crystal serving to secure disc 5 as clearly illustrated in Figure 3.

The instrument constructed in the manner illustrated and described may be used by a pedestrian or, if preferred, may be readily mounted upon the instrument board of an automobile or other vehicle to indicate the direction in which the vehicle is traveling.

What I claim is:

In a device of the character described, a thin flat casing adapted to be carried in the pocket, a disc of opaque material mounted in the casing, a magnetic needle mounted for free turning movement within the casing beneath the disc, said disc being provided with an observation opening, a compass-card secured on said needle to turn therewith, and a transparent closure member secured in the upper end of the casing and acting to secure said disc.

In testimony whereof I affix my signature.

ALONZO WILSON COLEMAN